United States Patent
Seykora et al.

(10) Patent No.: US 12,491,064 B2
(45) Date of Patent: Dec. 9, 2025

(54) CANNULATED SUTURE AND/OR GRAFT ANCHOR

(71) Applicant: Acumed LLC, Hillsboro, OR (US)

(72) Inventors: Andrew W. Seykora, Portland, OR (US); Brandon Wedam, North Plains, OR (US); Mark B. Sommers, Beaverton, OR (US)

(73) Assignee: Acumed LLC, Hillsboro, OR (US)

( * ) Notice: Subject to any disclaimer, the term of this patent is extended or adjusted under 35 U.S.C. 154(b) by 443 days.

(21) Appl. No.: 17/521,005

(22) Filed: Nov. 8, 2021

(65) Prior Publication Data

US 2022/0142766 A1   May 12, 2022

Related U.S. Application Data

(60) Provisional application No. 63/111,953, filed on Nov. 10, 2020.

(51) Int. Cl.
*A61F 2/08* (2006.01)
*A61B 17/04* (2006.01)
(Continued)

(52) U.S. Cl.
CPC .......... *A61F 2/0811* (2013.01); *A61B 17/848* (2013.01); *A61F 2/0805* (2013.01);
(Continued)

(58) Field of Classification Search
CPC ................ A61F 2/0811; A61F 2/0805; A61F 2002/0841; A61F 2002/0852;
(Continued)

(56) References Cited

U.S. PATENT DOCUMENTS 5,314,429 A * 5/1994 Goble ............... A61B 17/1764
606/88
2004/0230194 A1   11/2004 Urbanski et al.
(Continued)

FOREIGN PATENT DOCUMENTS

| EP | 2841016 B1 | 9/2019 |
|---|---|---|
| WO | 2014117107 A1 | 7/2014 |
| WO | WO 2022/103688 A1 | 5/2022 |

OTHER PUBLICATIONS

International Search Report corresponding to related International Patent Application No. PCT/US2021/058417 mailed Jan. 27, 2022, 3 pages.
(Continued)

*Primary Examiner* — Christie Bahena
(74) *Attorney, Agent, or Firm* — Knobbe, Martens, Olson & Bear, LLP

(57) ABSTRACT

The present disclosure provides a system, method, and cannulated anchor for treating acute or chronic instability of two boney structures in a patient. The provided cannulated anchor includes an opening through which suture, and in some instances a tendon graft, may be positioned. The cannulated anchor also includes a securing mechanism that helps maintain its position when installed in bone, such as flexible prongs, angled tabs, or ridges. The cannulated anchor is installed by being translated over a k-wire with a cannulated inserter that engages the cannulated anchor. The k-wire passes through the tendon graft, if used, as the cannulated anchor is translated over the k-wire. Passing the k-wire through the tendon graft allows the tendon graft to take up more space within the cannulated anchor's opening versus being biased to one side of the k-wire during insertion.

18 Claims, 18 Drawing Sheets

(51) Int. Cl.
*A61B 17/68* (2006.01)
*A61B 17/84* (2006.01)

(52) U.S. Cl.
CPC ............... *A61B 2017/0409* (2013.01); *A61B 2017/0445* (2013.01); *A61B 2017/0453* (2013.01); *A61B 2017/681* (2013.01); *A61F 2002/0841* (2013.01); *A61F 2002/0852* (2013.01); *A61F 2002/0864* (2013.01)

(58) Field of Classification Search
CPC ........... A61F 2002/0864; A61B 17/848; A61B 2017/0409; A61B 2017/0445; A61B 2017/0453; A61B 2017/861; A61B 2017/0841; A61B 2017/681; A61B 2017/0459
See application file for complete search history.

(56) References Cited

U.S. PATENT DOCUMENTS

| | | | | |
|---|---|---|---|---|
| 2008/0269743 A1* | 10/2008 | McNamara | ........... | A61F 2/0811 606/228 |
| 2010/0063541 A1* | 3/2010 | Brunelle | ............... | A61F 2/0811 606/301 |
| 2010/0331897 A1* | 12/2010 | Lindner | ............ | A61B 17/7041 606/305 |
| 2012/0046746 A1* | 2/2012 | Konicek | ................... | A61F 2/08 623/13.14 |
| 2012/0203340 A1 | 8/2012 | Choinski et al. | | |
| 2013/0035721 A1* | 2/2013 | Brunelle | ............ | A61B 17/0401 606/232 |
| 2013/0197575 A1* | 8/2013 | Karapetian | ........ | A61B 17/0401 606/232 |
| 2018/0221017 A1 | 8/2018 | Stone et al. | | |
| 2022/0133466 A1* | 5/2022 | Wedam | ................. | A61F 2/0805 623/13.14 |

OTHER PUBLICATIONS

International Written Opinion corresponding to related International Patent Application No. PCT/US2021/058417 mailed Jan. 27, 2022, 20 pages.
International Preliminary Report corresponding to related International Patent Application No. PCT/US2021/058417, mailed May 25, 2023, 8 pages.
Extended European Search Report from corresponding European Patent Application No. 21892631.9, mailed Mar. 13, 2024. 8 pages.
Office Action corresponding to related European Patent Application No. 21892631.9 dated Nov. 14, 2024, 5 pages.

* cited by examiner

CANNULATED SUTURE AND/OR GRAFT ANCHOR

PRIORITY CLAIM

The present application claims priority to and the benefit of U.S. Provisional Application 63/111,953, filed Nov. 10, 2020, the entirety of which is herein incorporated by reference.

BACKGROUND

For a variety of reasons, patients may experience acute or chronic instability of two boney structures. Traumatic injury, overuse, and advanced age are example factors that may cause degradation of ligamentous attachments between two boney structures, which leads to instability. One specific example is instability or degradation of the scapholunate in the wrist. Degradation of ligamentous attachments between two boney structures can cause several negative effects including pain, arthritis, restricted motion, and loss of strength, among others. Treating such acute and chronic instabilities requires anatomic repositioning of the bony structures, such as with suture and an anchor. In many cases, treatment may also include a biological component, such as a tendon graft, to improve strength over the long term.

Surgical procedures used to reposition a boney structure, or install a biological component, are generally considered open surgical procedures. An open surgical procedure increases surgical complication risks and the procedure's morbidity, and increases a patient's recovery time. At least one typical percutaneous surgical procedure to reposition a boney structure involves clamping a boney structure to reposition the boney structure, drilling a hole into bone, and securing the boney structure (e.g., an anchor and suture), all while the boney structure is clamped. In at least some instances, the bones and/or clamp may shift during the procedure. Such shifting may lead to an unintended or undesired repositioning of the boney structure.

Additionally, it may be difficult to install a tendon graft via typical surgical procedures to treat instability of two boney structures. In some instances, a surgeon must drill a bone hole that is large enough to accommodate a tendon graft, suture, and an insertion component side by side. Larger bone holes may contribute to longer patient recovery times. In other instances, a surgeon must drill two separate bone holes: a first bone hole for an anchor and suture; and a second bone hole for the tendon graft. Two separate holes increases the likelihood of over-drilling and is more difficult for the surgeon to perform than drilling a single bone hole.

Accordingly, a surgical system, method, and anchor that help solve the above drawbacks are desired.

SUMMARY

The present disclosure provides new and innovative anchors, systems, and methods for treating acute or chronic instability of two boney structures. A surgeon or other healthcare professional may install a provided cannulated anchor by translating it over a k-wire with a cannulated inserter that engages the cannulated anchor. Translating the cannulated anchor over a k-wire avoids the need to use a clamp to hold the two boney structures together, thereby helping prevent components from shifting. The cannulated anchor may have an opening through which suture and/or a tendon graft can be positioned so that it may be installed with the cannulated anchor.

In an example, a system for treating instability of two boney structures includes a cannulated anchor, suture, a tendon graft, and a cannulated inserter. The cannulated anchor includes a body portion having an opening along a first axis substantially perpendicular to a second axis along which a cannulation of the body portion extends. The suture and the tendon graft are each positioned through the opening of the body portion. The cannulated inserter is adapted to engage a trailing end of the body portion of the cannulated anchor.

In another example, a method for treating instability of two boney structures includes a surgeon selecting a cannulated anchor that has a body portion having an opening along a first axis substantially perpendicular to a second axis along which a cannulation of the body portion extends. The surgeon may position suture through the opening of the cannulated anchor. The surgeon may position a tendon graft through the opening of the cannulated anchor. The surgeon may install a k-wire into two boney structures of a patient. A bone hole may then be generated through the two boney structures over the k-wire. The surgeon may translate the cannulated anchor over the k-wire and into the bone hole via a cannulated inserter such that the k-wire is positioned through the tendon graft and through the cannulation of the cannulated anchor. The cannulated inserter can then be removed from the patient.

DETAILED DESCRIPTION

Figure 1A:
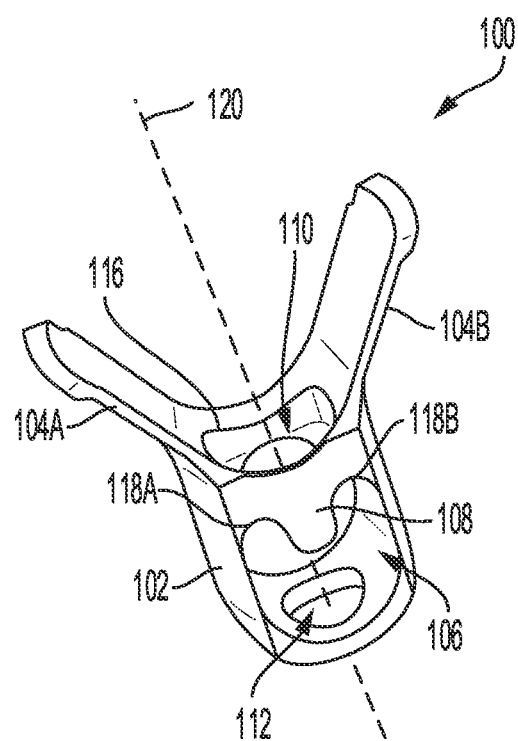
FIG. 1A illustrates a perspective view of a cannulated anchor having two prongs, according to an aspect of the present disclosure.

The present disclosure provides a system, method, and cannulated anchor for treating acute or chronic instability of two boney structures in a patient. For example, the two boney structures may be a scaphoid bone and a lunate bone, a tibia bone and a fibula bone, or a clavicle and a coracoid process. The provided cannulated anchor includes an opening through which suture, and in some instances a tendon graft, may be positioned The cannulated anchor may also include a securing mechanism that helps maintain its position when installed in bone, such as flexible prongs, angled tabs, or ridges. A surgeon or other healthcare professional may install the cannulated anchor by translating it over a k-wire with a cannulated inserter that engages the cannulated anchor. Translating the cannulated anchor over a k-wire avoids the need to use a clamp to hold the two boney structures together because the k-wire holds the boney structures in place. Holding the boney structures together with the k-wire helps prevent components from shifting as compared to holding the boney structures together with a clamp. The presently disclosed method may involve percutaneously installing a k-wire into two boney structures at a desired position, drilling a bone hole over the k-wire, and translating the cannulated anchor into the bone hole over the k-wire, which simplifies the procedure as compared to typical methods.

In some instances, the k-wire may pass through a tendon graft positioned through the cannulated anchor's opening as the cannulated anchor is translated over the k-wire. Passing the k-wire through the tendon graft allows the tendon graft to take up more space within the cannulated anchor's opening versus being biased to one side of the k-wire during insertion, which may help reduce a required bone hole size for insertion as compared to some typical methods. Additionally, only a single bone hole is drilled to insert the provided construct including the cannulated anchor, a tendon graft, and suture.

The provided system also provides flexibility for instances in which a tendon graft is not needed. For example, acute instability of two boney structures, such as a carpal instability classified as a stage one or two Geissler, may be treated with the cannulated anchor and suture. In such examples, suture may be positioned through the cannulated anchor's opening while a tendon graft is not. In other examples, a tendon graft may be desired to treat the instability, such as a carpal instability classified as a stage three or four Geissler having rotational deformity. In such other examples, suture and a tendon graft may both be positioned though the cannulated anchor's opening. This flexibility provides the option of both initial fixation with hardware and suture and lasting fixation for chronic issues with a tendon graft that holds the boney structures together over a much longer period of time. Additional advantages of the presently disclosed system, method, and cannulated anchor will be apparent from the following description in connection with the figures.

FIG. 1A illustrates a perspective view of an example cannulated anchor 100. The cannulated anchor 100 includes a body portion 102. A cannulation extends through the body portion 102 along the axis 120 through the opening 110 and the opening 112. The cannulation enables the cannulated anchor 100 to translate over a wire, such as a k-wire. In this example, the opening 112 at the leading end of the cannulated anchor 100 is circular. The cannulated anchor 100 includes an opening 106 that extends through the body portion 102. The opening 106 extends along an axis that is substantially perpendicular to the axis 120 along which the cannulation extends. The cannulated anchor 100 may include the prongs 104A and 104B that extend from the body portion 102. The prongs 104A, 104B are flexible such that they may bend towards and away from the axis 120. This enables the prongs 104A, 104B to be compressed towards the axis 120 while the cannulated anchor 100 is translated through a bone hole, and then expand to prevent the cannulated anchor 100 from being pulled back through the bone hole.

In some examples, the body portion 102 includes at least one protrusion 108 thereby forming at least one groove 118A, 118B. In this example, the protrusion 108 forms the groove 118A and the groove 118B on either side of the protrusion 108. In other examples, the protrusion 108 may extend from the side of the body portion 102 including the prong 104A or 104B thereby only forming the groove 118A or the groove 118B. The body portion 102 may include another protrusion 108 on the opposite, non-visible face of the body portion 102 in FIG. 2A. The cannulated anchor 100 may have other suitable configurations that enable at least one groove 118A, 118B to be offset from the axis 120.

The body portion 102 of the cannulated anchor 100 may include a key 116 at its trailing end. The key 116 is an indentation adapted to engage with a tip of a cannulated inserter. The key 116 may have a rounded rectangular shape as illustrated or another suitable shape. A surgeon may use the cannulated inserter to install the cannulated anchor 100 into a patient. Example cannulated inserters will be discussed in more detail below in connection with FIGS. 8A and 8B.

The cannulated anchor 100 may be constructed of any suitable medical-grade material for implants, such as titanium, a nickel-titanium alloy, stainless steel, or a polymeric composition including a polymer such as PEEK, PMMA, or ultra-high molecular weight polyetheylene. In aspects in which the cannulated anchor 100 is constructed of a polymer, the cannulated anchor 100 may be manufactured by, for example, injection molding. In some instances, the material of the cannulated anchor 100 may be selected based on a density of the bone for which it will be used. For example, titanium or stainless steel may be used for harder, denser bone, whereas a nickel-titanium alloy or a polymeric composition may be used for softer, less dense bone. In at least one example, the cannulated anchor 100 is constructed of a shape-memory material, such as nitinol. The shape-memory material may help enable the flexibility of the prongs 104A, 104B. In some instances, the prongs 104A, 104B may be constructed of a shape-memory material while the rest of the cannulated anchor 100 is constructed of another suitable medical-grade material.

Figure 1B:
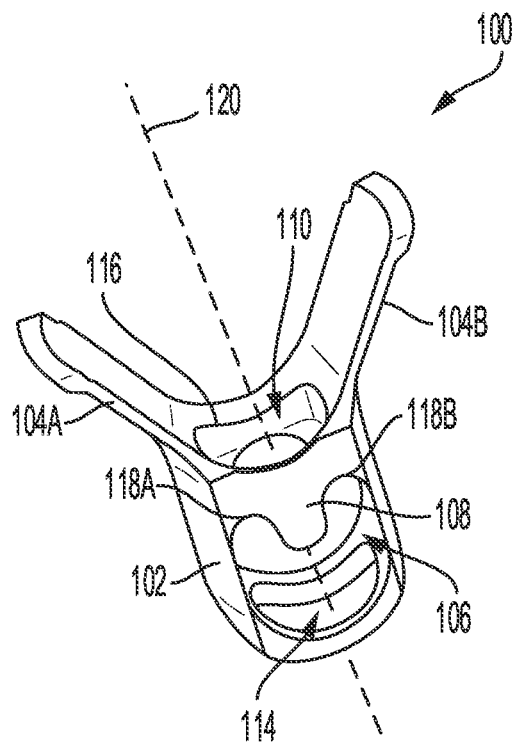
FIG. 1B illustrates a perspective view of a cannulated anchor having two prongs and a cannulation with an elongated opening, according to an aspect of the present disclosure.

FIG. 1B illustrates a perspective view of another example of the cannulated anchor 100. The cannulated anchor 100 in this example includes an elongated opening 114 at its leading end rather than the circular opening 112 illustrated in FIG. 1A. The elongated opening 114 may enable the cannulated anchor 100 to toggle or rotate when positioned over a k-wire during installation or once installed. For instance, the elongated opening 114 may enable the cannulated anchor 100 to rotate when one of its prongs 104A or 104B catches on a bone hole wall during installation. Enabling this rotation in such instances may help with positioning the cannulated anchor 100 during installation.

Figure 2A:
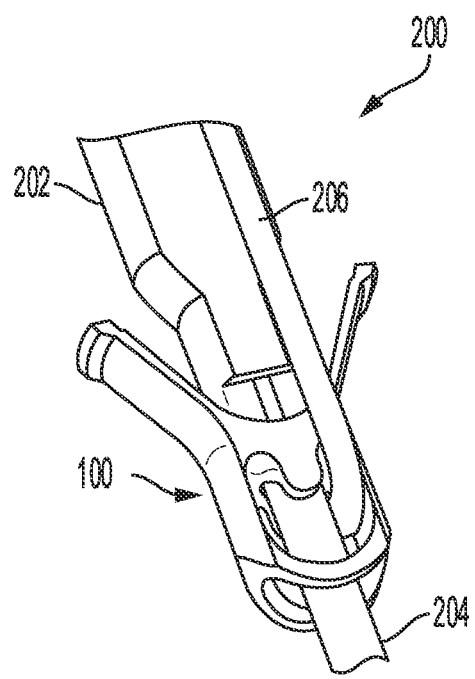
FIG. 2A illustrates a perspective view of a system for treating instability in two boney structures without a tendon graft, according to an aspect of the present disclosure.

FIG. 2A illustrates an example system 200 for treating instability in two boney structures. The system 200 includes the cannulated anchor 100 and a cannulated inserter 202. In other instances, the system 200 may include any of the cannulated anchors provided by the present disclosure other than the cannulated anchor 100. A surgeon may engage the cannulated inserter 202 with the key 116 of the cannulated anchor 100 to install the cannulated anchor 100. In some aspects, the system 200 may include suture 206. The suture 206 may be positioned through the opening 106 and within the groove 118A or 118B of the cannulated anchor 100. Positioning the suture 206 within the groove 118A or 118B helps maintain the suture 206 in a position that is offset from the axis 120 of the cannulated anchor 100. The offset positioning of the suture 206 helps flip the cannulated anchor 100 into place upon a surgeon tensioning the suture 206 during a procedure to install the cannulated anchor 100. The suture 206 may be a suitable flexible material, e.g., suture or suture tape. In some instances, the suture 206 may be a single strand of suture. In other instances, the suture 206 may be multiple strands of suture. In at least one instance, the suture 206 can be an adjustable or non-adjustable loop.

In various aspects, the system 200 may include a k-wire 204. As known in the art, a k-wire 204, or Kirschner wire, is a thin metallic wire or pin that can be used to stabilize bone fragments. As used herein, a k-wire 204 may refer to a Kirschner wire or another suitable guidewire. A leading end of the k-wire 204 may be drilled through bone to hold fragments in place. A surgeon may install a k-wire 204 percutaneously. In some aspects, the k-wire 204 may have a sharp trailing end. For example, the k-wire 204 may be a double-sided trocar k-wire. The cannulated anchor 100 and the cannulated inserter 202 may be translated over the k-wire 204 such that the k-wire 204 is positioned within the respective cannulations of the cannulated anchor 100 and the cannulated inserter 202.

Figure 2B:
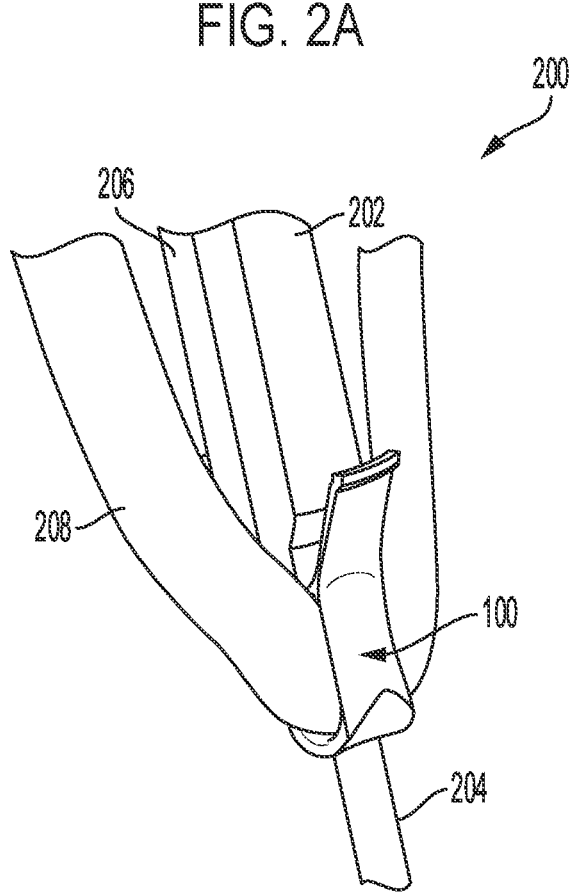
FIGS. 2B and 2C illustrate a perspective and cross sectional view, respectively, of a system for treating instability in two boney structures with a tendon graft, according to an aspect of the present disclosure.
Figure 2C:
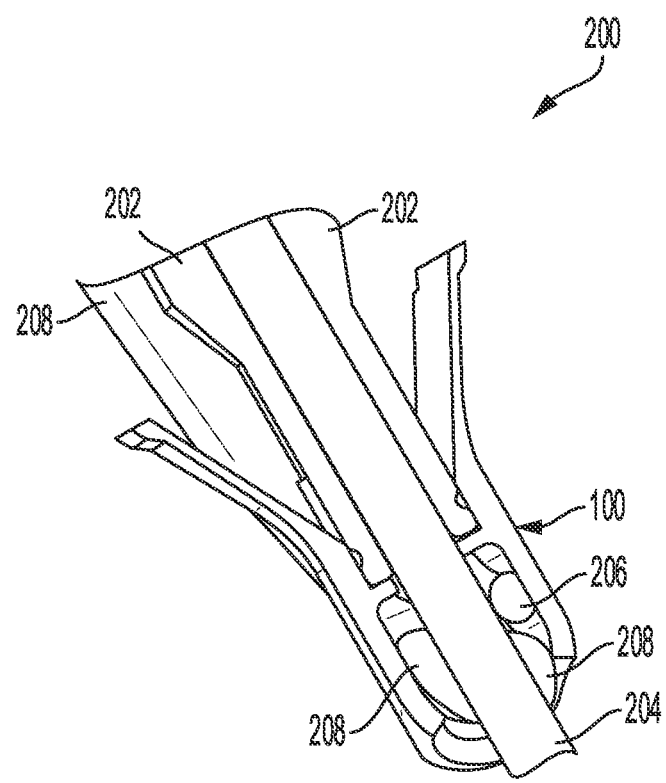

In some aspects of the present disclosure, a surgeon may use the above-described components of the example system 200 to treat instability of two boney structures. For example, a surgeon may treat a carpal instability classified as a stage one or two Geissler using the cannulated anchor 100 and suture 206. In other aspects of the present disclosure, the example system 200 may include a tendon graft 208 as illustrated in FIGS. 2B and 2C. For example, a surgeon may use a tendon graft 208 to treat a carpal instability classified as a stage three or four Geissler having rotational deformity. The presently disclosed system 200 therefore provides a surgeon with flexibility for treating a patient with or without a tendon graft 208.

The tendon graft 208 may be an autograft from a patient or an allograft from a cadaver. When utilized, the tendon graft 208 is positioned through the opening 106 of the cannulated anchor 100. In this positioning, when a surgeon translates the cannulated anchor 100 including a tendon graft 208 over the k-wire 204, a sharp trailing end of the k-wire 204 may pierce through longitudinal fibers of the tendon graft 208. In other instances, the surgeon may separate the longitudinal fibers of the tendon graft 208 in another suitable way such that the tendon graft 208 passes over the k-wire 204. The cross section of the system 200 illustrated in FIG. 2C shows the k-wire 204 positioned through the tendon graft 208 and through the respective cannulations of the cannulated anchor 100 and the cannulated inserter 202. Positioning the tendon graft 208 through the opening 106 as provided by the cannulated anchor 100 enables a surgeon to use a larger tendon graft 208 (e.g., between two to three millimeters in diameter) than typical systems without increasing the size of the system 200, in part because positioning the tendon graft 208 side by side with the cannulated anchor 100 is avoided. Positioning the tendon graft 208 through the opening 106 additionally avoids drilling a second bone hole for the tendon graft 208.

In various aspects of the present disclosure, the provided cannulated anchor may have a variety of suitable configurations other than that described for the example cannulated anchor 100. Examples of some of these suitable configurations will follow. It will be appreciated, however, that various aspects of the described examples may be combined, rearranged, or removed to form other suitable configurations. It will also be understood that the above description of the example cannulated anchor 100 may apply to the below-described aspects unless stated otherwise. Some aspects from the cannulated anchor 100 are not indicated with reference characters in the following figures for the sake of clarity.

Figure 3A:
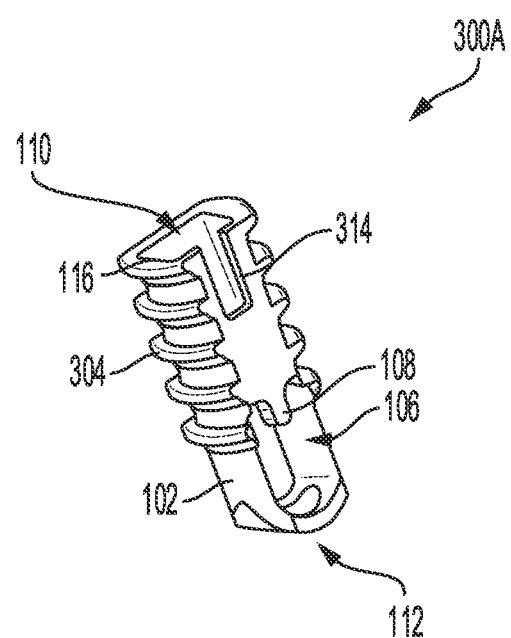
FIG. 3A illustrates a perspective view of a cannulated anchor having ridges and a closed leading end, according to an aspect of the present disclosure.

FIG. 3A illustrates an example cannulated anchor 300A. The cannulated anchor 300A is similar to the cannulated anchor 100, except that instead of the prongs 104A, 104B as a securing mechanism, the cannulated anchor 300A includes a plurality of ridges 304 as its securing mechanism. The ridges 304 obtain purchase into bone to secure the cannulated anchor 300A in position once installed. To obtain purchase into bone, the ridges 304 extend outward from the cannulated anchor 300A farther than a bone hole diameter into which it will be installed. In some instances, such as the illustrated example, the ridges 304 extend around only a portion of the perimeter of the cannulated anchor 300A. In other instances, one or more of the ridges 304 may extend around the full perimeter of the cannulated anchor 300A. The cannulated anchor 300A may include any suitable quantity of ridges (e.g., 3, 4, 5, 6, 7, etc.) along its body portion 102. Suture 206, and in some instances a tendon graft 208, may be positioned through the opening 106 of the cannulated anchor 300A.

In some instances, the body portion 102 of the cannulated anchor 300A may include a notch 314. The body portion 102 of the cannulated anchor 300A may also include a notch 314 on the opposite, non-illustrated face of the cannulated anchor 300A. The notch 314 may help a surgeon engage and disengage a cannulated inserter (e.g., the cannulated inserter 202) with the cannulated anchor 300A by enabling the trailing end of the cannulated anchor 300A to expand and contract. For example, the trailing end's expansion may enable a notch of the cannulated inserter's tip to pass through and engage with an indentation in the key 116 of the cannulated anchor 300A, at which point the trailing end contracts to its resting shape.

Figure 3B:
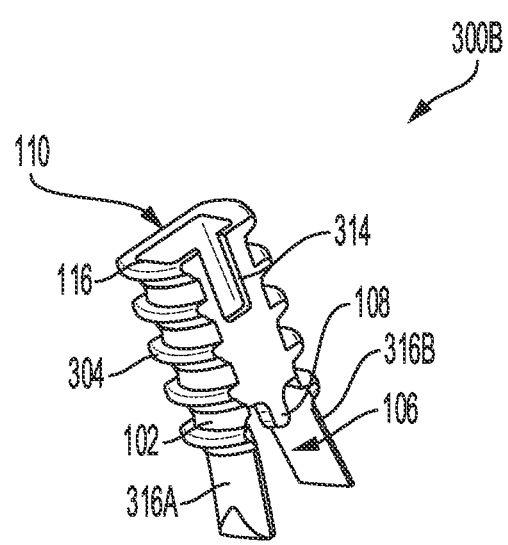
FIG. 3B illustrates a perspective view of a cannulated anchor having ridges and a leading end with two prongs, according to an aspect of the present disclosure.

FIG. 3B illustrates an example cannulated anchor 300B. The cannulated anchor 300B is similar to the cannulated anchor 300A, except that instead of a closed leading end, the cannulated anchor 300B includes an open leading end having tines 316A and 316B. In such instances, a tendon graft 208 may be positioned between the tines 316A and 316B (e.g., through the opening 106).

Figure 4A:
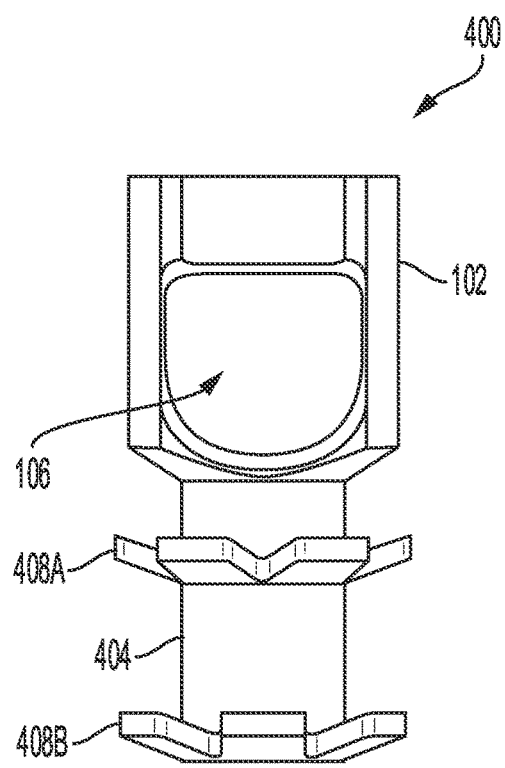
FIGS. 4A and 4B illustrate perspective views of a cannulated anchor having sets of angled lobes, according to an aspect of the present disclosure.
Figure 4B:
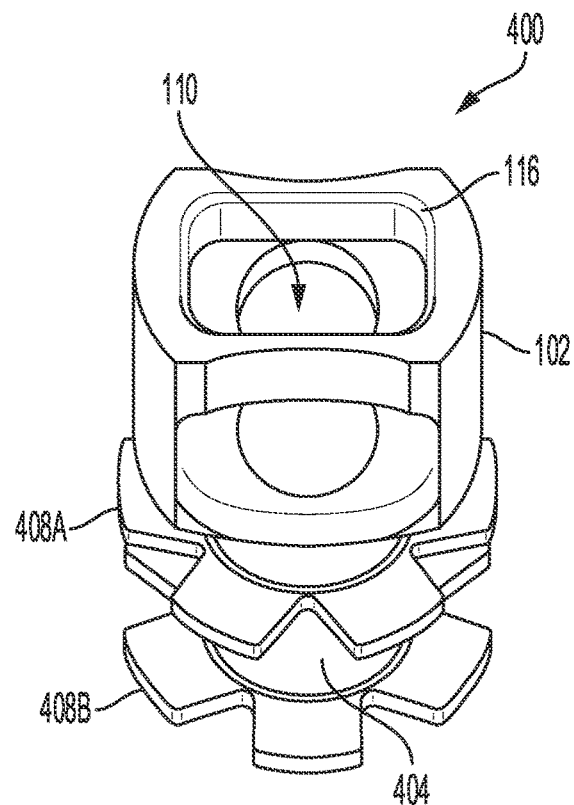

FIGS. 4A and 4B illustrate an example cannulated anchor 400. As compared to the previously described cannulated anchors 100, 300A, and 300B, the cannulated anchor 400 includes the opening 106 at its trailing end rather than its leading end. In other aspects, the opening 106 of the cannulated anchor 400 may be at its leading end. A tube 404 may extend from the body portion 102 of the cannulated anchor 400. One or more sets of angled lobes 408A, 408B may extend radially from the tube 404 that act as a securing mechanism for the cannulated anchor 400. Each set of angled lobes 408A, 408B may include any suitable quantity of angled lobes (e.g., 4, 5, 6, 7 etc.). The one or more sets of angled lobes 408A, 408B are configured to deflect towards the tube 404 during insertion of the cannulated anchor 400 to ease entry, but then expand once installed to prevent removal, similar to the prongs 104A, 104B. For instance, the cannulated anchor 400, or at least the one or more sets of angled lobes 408A, 408B, may be constructed of a shape-memory material (e.g., nitinol). In some instances, though not illustrated, the body portion 102 of the cannulated anchor 400 may include a protrusion 108 extending into the opening 106.

Figure 5:
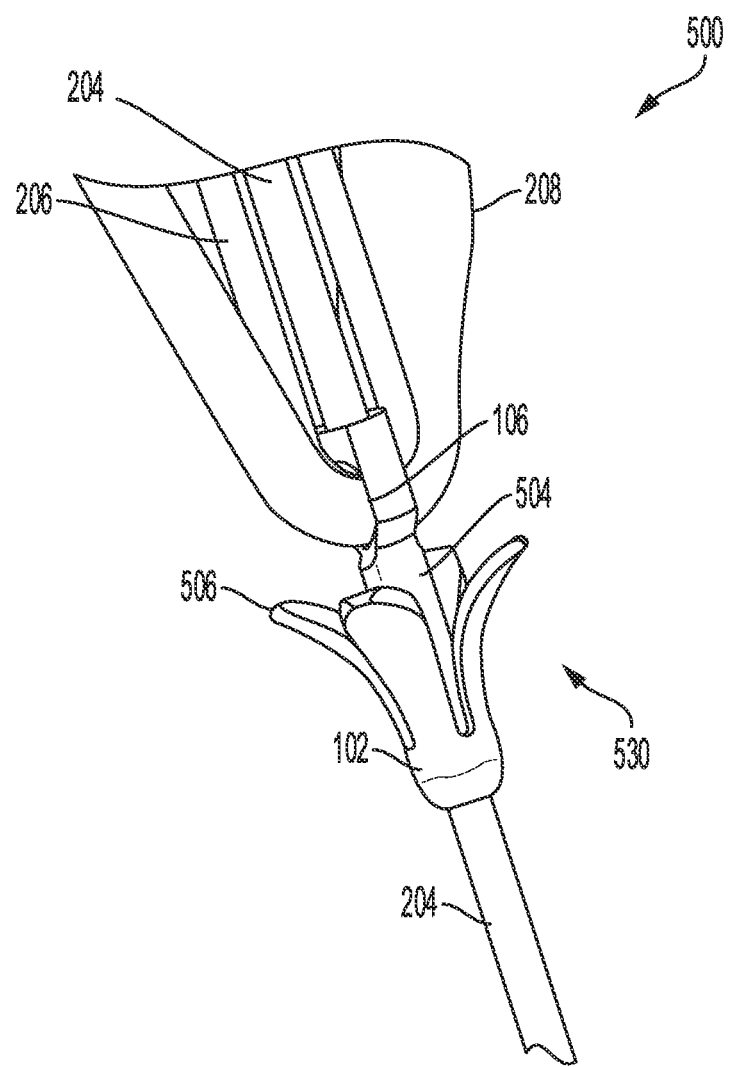
FIG. 5 illustrates a perspective view of a system including a cannulated anchor having four prongs and an opening at its trailing end, according to an aspect of the present disclosure.

FIG. 5 illustrates an example system 500 that includes an example cannulated anchor 530. Similar to the cannulated anchor 400, the cannulated anchor 530 includes an opening 106 at its trailing end. In other aspects, the opening 106 of the cannulated anchor 530 may be at its leading end. The opening 106 is included in a tube 504 that extends from the body portion 102 of the cannulated anchor 530. At its leading end, the cannulated anchor 530 includes multiple prongs 506 extending from the body portion 102 of the cannulated anchor 530. Only one of the four prongs 506 is indicated in FIG. 5 for the sake of clarity in the figure. The cannulated anchor 530 may include any suitable quantity of prongs 506 (e.g., 3, 4, 5, etc.). The prongs 506 are flexible such that they may bend towards and away from a central, long axis of the cannulated anchor 530, similar to the prongs 104A, 104B. This flexibility enables the prongs 506 to deflect towards the tube 504 during insertion of the cannulated anchor 530 to ease entry, but then expand away from the tube 504, as illustrated, once installed to prevent removal. For instance, the cannulated anchor 530, or at least the prongs 506, may be constructed of a shape-memory material (e.g., nitinol). In some instances, though not illustrated, the body portion 102 of the cannulated anchor 530 may include a protrusion 108 extending into the opening 106.

Figure 6:
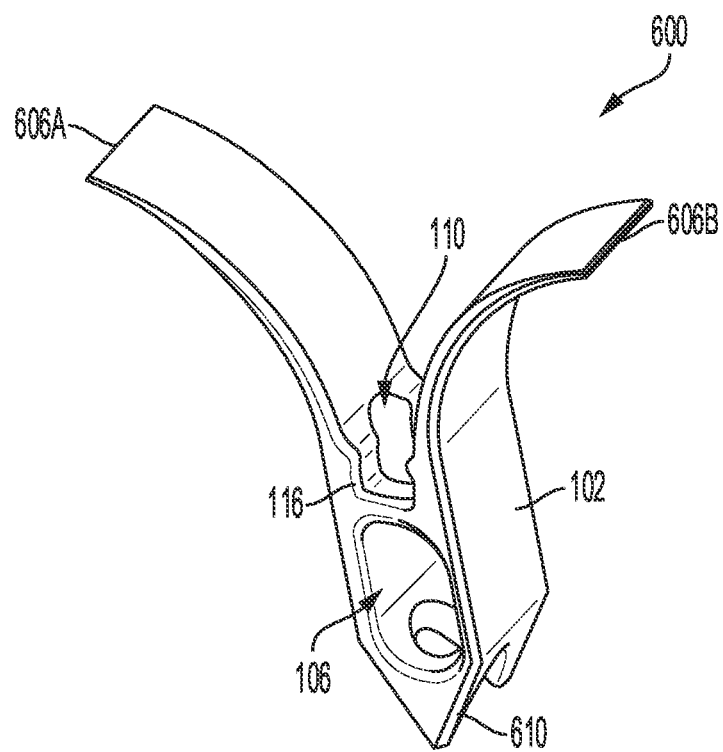
FIG. 6 illustrates a perspective view of a cannulated anchor having two prongs and a point leading end, according to an aspect of the present disclosure.

FIG. 6 illustrates an example cannulated anchor 600. The cannulated anchor 600 includes the prongs 606A, 606B extending from its body portion 102. The prongs 606A, 606B are flexible such that they may bend towards and away from a central, long axis of the cannulated anchor 600, similar to the prongs 104A, 104B. This flexibility enables the prongs 606A, 606B to deflect towards the central, long axis during insertion of the cannulated anchor 600 to ease entry, but then expand away from the central, long axis, as illustrated, once installed to prevent removal. The prongs 606A, 606B may also expand away from the central, long axis to allow a tip of a cannulated inserter to pass into the key 116. The cannulated anchor 600, or at least the prongs 606A, 606B, may be constructed of a shape-memory material (e.g., nitinol). The cannulated anchor 600 may include a pointed leading end 610. The pointed leading end 610 may help assist a surgeon insert the cannulated anchor 600. In some instances, though not illustrated, the body portion 102 of the cannulated anchor 600 may include a protrusion 108 extending into the opening 106.

Figure 7:
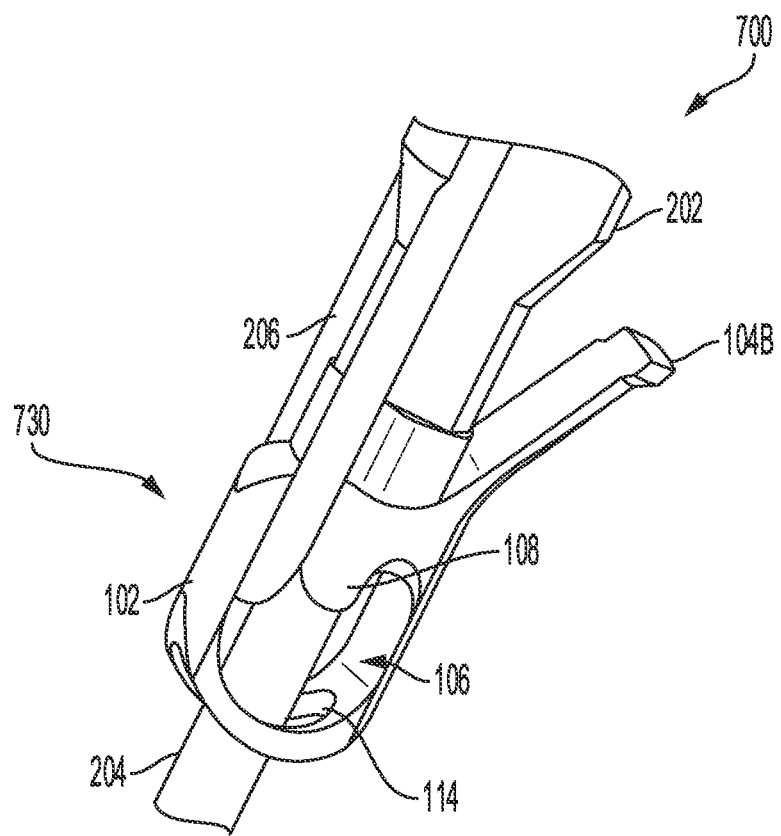
FIG. 7 illustrates a perspective view of a system including a cannulated anchor having a single prong, according to an aspect of the present disclosure.

FIG. 7 illustrates an example system 700 including an example cannulated anchor 730. The cannulated anchor 730 is similar to the cannulated anchor 100, except that the cannulated anchor 730 includes only a single prong, such as the prong 104B. In some instances, the single prong 104B may provide sufficient pull-out force for the cannulated anchor 730 once it is installed. The single prong 104B can additionally help ensure that the cannulated anchor 730 flips or toggles in a desired direction during or after installation. To further facilitate the cannulated anchor 730 flipping or toggling in the desired direction, the suture 206 in the system 700 may be positioned in the groove 118A opposite the single prong 104B. In this positioning, tensioning the suture 206 helps facilitate the cannulated anchor 730 flipping or toggling in the desired direction.

The above-described aspects of the example cannulated anchors 100, 300A, 300B, 400, 530, 600, and 730 may be combined, rearranged, or removed to form other suitable configurations of the provided cannulated anchor. For example, the cannulated anchor 300B may include the prongs 104A, 104B at its trailing end rather than including the ridges 304. In another example, the cannulated anchor 600 may include ridges 304 on its body portion 102 in addition to, or alternatively to, the prongs 606A, 606B.

Figure 8A:
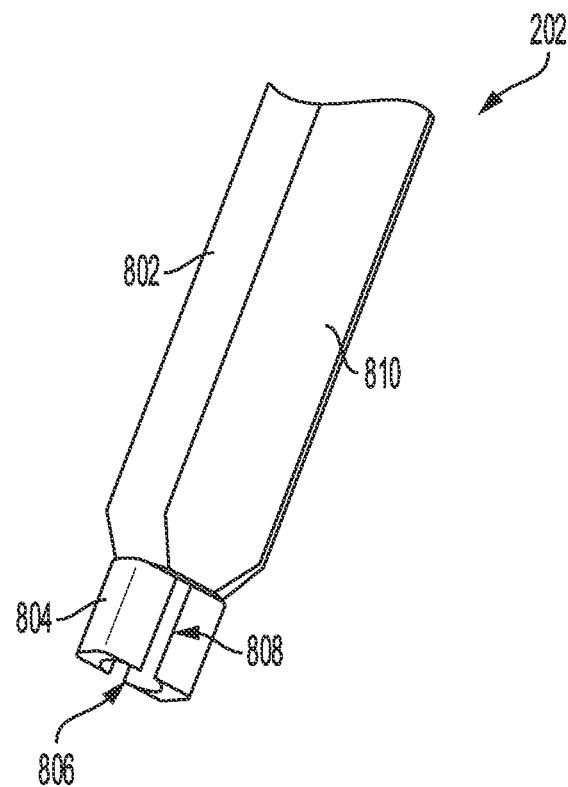
FIG. 8A illustrates a perspective view of a cannulated inserter, according to an aspect of the present disclosure.

FIG. 8A illustrates a leading end of the example cannulated inserter 202. The cannulated inserter 202 includes a shaft 802. The shaft 802 may extend into, or be connected to, a handle at a trailing end of the cannulated inserter 202. In some instances, the shaft 802 includes a groove 810 along its length. The shaft 802 may include a groove 810 on the opposing, non-illustrated side of the shaft 802. The groove (s) 810 reduces a width of the shaft 802 to allow for more room for the suture 206, and in some instances the tendon graft 208. The shaft 802 includes a tip 804. The tip 804 is adapted to engage with a key 116 of the provided cannulated anchor (e.g., the cannulated anchor 100), and thus has a shape that corresponds to the key 116 of a particular cannulated anchor. In some instances, the tip 804 may include one or more gaps 808. For example, in the illustrated embodiment, the tip 804 includes two separate gaps 808 on opposing sides. In such instances, the tip 804 may compress, closing the gap(s) 808 at least partially, when inserted into the key 116. A reactive force from such compression of the tip 804 may facilitate a friction fit that helps engage the tip 804 to the provided cannulated anchor. FIG. 8A additionally illustrates an opening to a cannulation 806. The cannulation 806 extends the length of the cannulated inserter 202.

Figure 8B:
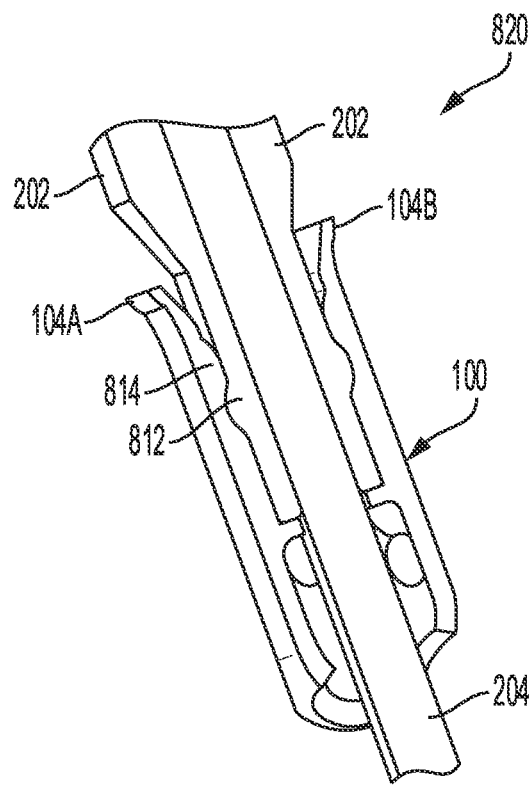
FIG. 8B illustrates a perspective view of a system including a cannulated inserter having a lobed tip and a cannulated anchor having lobed prongs, according to an aspect of the present disclosure.

In some instances, the cannulated inserter 202 may be configured to help set the provided cannulated anchor 100 upon removing the cannulated inserter 202 during installation. For example, FIG. 8B illustrates a cross section of an example system 820 including a cannulated inserter 202 and a cannulated anchor 100 each having a respective lobe 812 and 814. When the prongs 104A, 104B are compressed towards the cannulated inserter 202, such as during insertion, the prongs 104A, 104B form fit with the tip of the cannulated inserter 202. Upon disengaging the cannulated inserter 202 from the cannulated anchor 100, the lobe 812 of the cannulated inserter 202 passes by the lobe 814 of the cannulated anchor 100, forcing the prongs 104A, 104B away from one another, which helps set the cannulated anchor 100.

In another example, the lobe 812 of the cannulated inserter 202 may be oriented ninety degrees from the lobe 814 of the cannulated anchor 100. In such examples, rotating or twisting the cannulated inserter 202 causes the lobe 812 to pass by the lobe 814 and force the prongs 104A, 104B away from one another. In another example, the cannulated inserter 202 may include a sleeve (not illustrated) that may slide along at least a portion of the length of the cannulated inserter 202. In such examples, a surgeon may slide the sleeve to come into contact with the cannulated anchor 100, which forces the prongs 104A, 104B away from one another while forcing the cannulated anchor 100 off of the cannulated inserter 202.

The cannulated inserter 202 may be constructed of any suitable medical-grade material. For instance, the cannulated inserter 202 may be constructed of titanium, a nickel-titanium alloy, stainless steel, or a polymeric composition including a polymer such as PEEK, PMMA, or ultra-high molecular weight polyetheylene.

Figure 9:
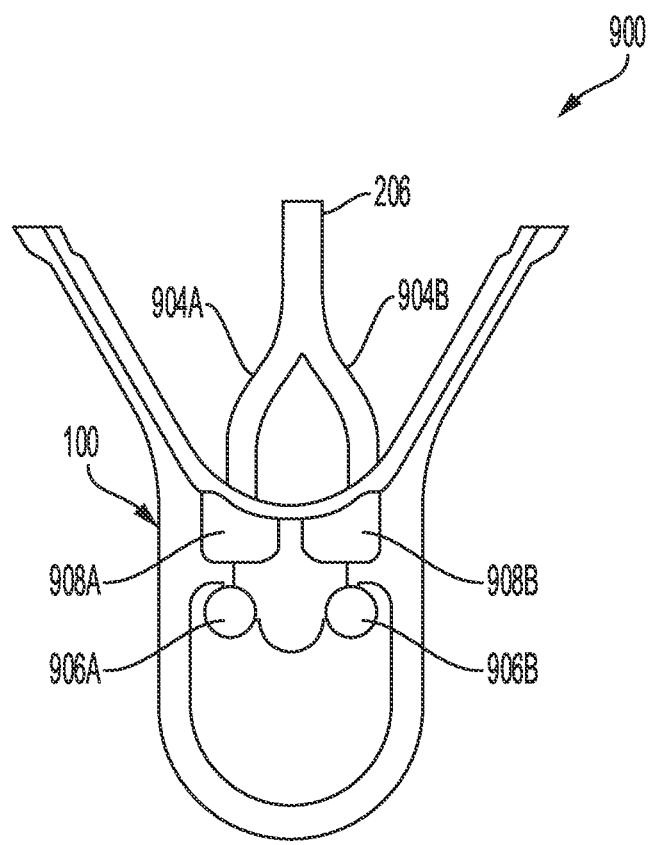
FIG. 9 illustrates a side view of a system including split ends of suture positioned within a cannulated anchor's suture slots, according to an aspect of the present disclosure.

In some aspects of the present disclosure, the suture 206 includes an end split into a first end 904A and a second end 904B as illustrated in the side view of an example system 900 in FIG. 9. In such aspects, the provided cannulated anchor (e.g., the cannulated anchor 100) may include a suture slot 908A and a suture slot 908B. The first end 904A of the suture 206 may be positioned through the suture slot 908A and the second end 904B of the suture 206 may be positioned through the suture slot 908B. The first end 904A may include a knot 906A and the second end 904B may include a knot 906B such that the first and second ends 904A and 904B are not pulled back through the respective suture slots 908A and 908B.

Figure 10A:
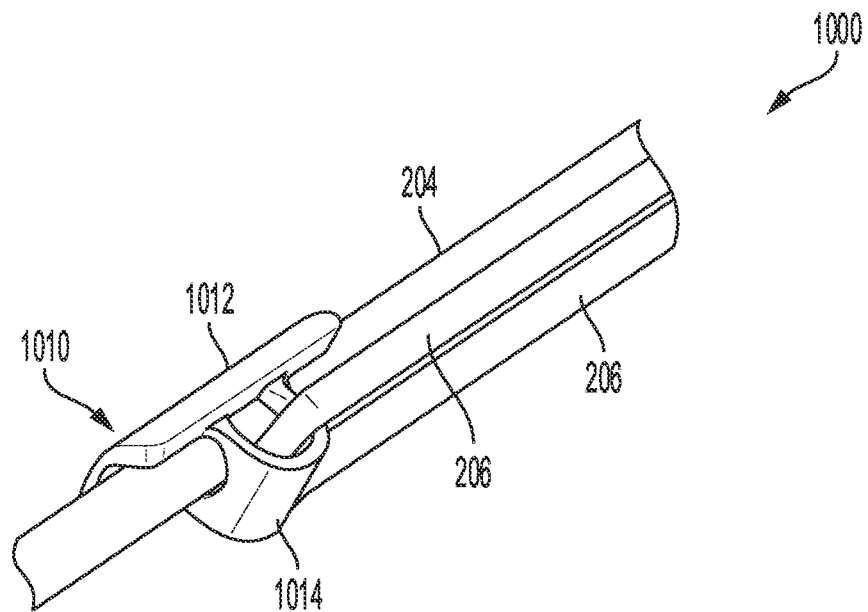
FIGS. 10A and 10B illustrate perspective views of a system including a cannulated button and suture, according to an aspect of the present disclosure.
Figure 10B:
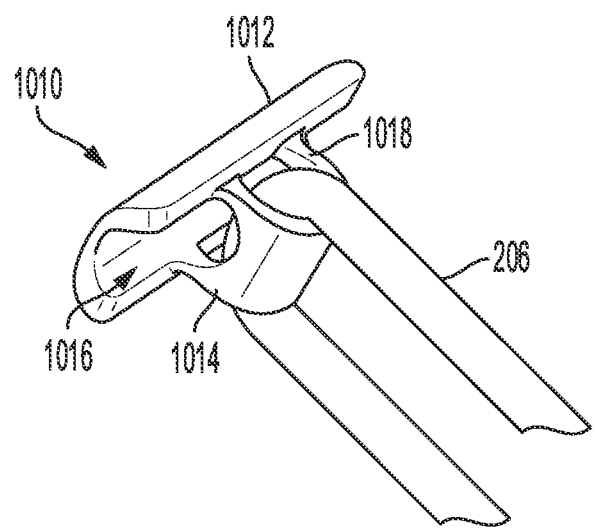

In some aspects of the present disclosure, the provided system includes a cannulated flip button instead of a cannulated anchor. FIGS. 10A and 10B illustrate an example system 1000 including an example flip button 1010. The flip button 1010 includes a body portion 1012. A peg 1014 extends from the body portion 1012. The flip button 1010 includes a cannulation 1016 that extends between the body portion 1012 and the peg 1014. The peg 1014 additionally includes an opening 1018 substantially perpendicular to a long axis of the body portion 1012.

The system 1000 may include a k-wire 204 positioned through the cannulation 1016 of the flip button 1010. For instance, a surgeon may translate the flip button 1010 over the k-wire 204 during installation. Suture 206 may be positioned through the opening 1018. As a surgeon translates the flip button 1010 over the k-wire 204, the suture 206 may be parallel to the k-wire 204 and to a length of the body portion 1012, as illustrated in FIG. 10A. Once the flip button 1010 is deployed (e.g., by removing the k-wire 204), the flip button 1010 may flip or rotate (e.g., substantially ninety degrees), as illustrated in FIG. 10B. After flipping or rotating, the flip button 1010 cannot be pulled back through a bone hole.

Figure 10C:
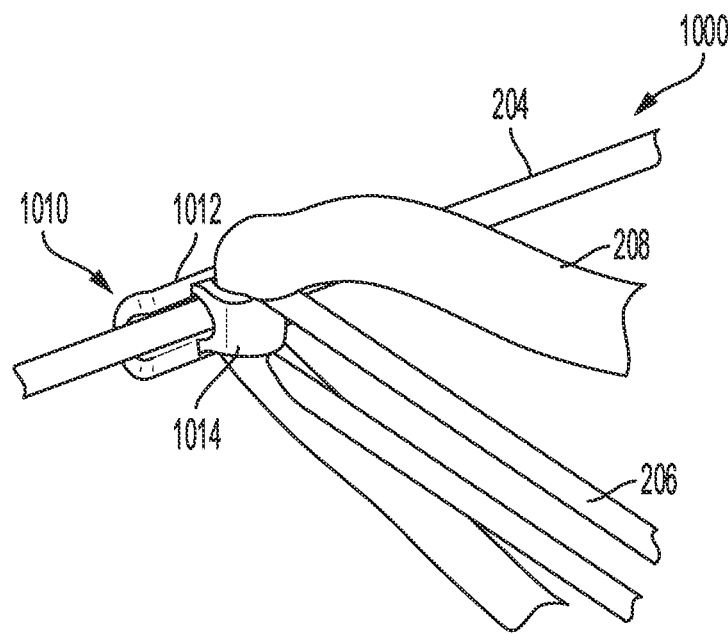
FIGS. 10C and 10D illustrate perspective views of a system including a cannulated button, suture, and a tendon graft, according to an aspect of the present disclosure.
Figure 10D:
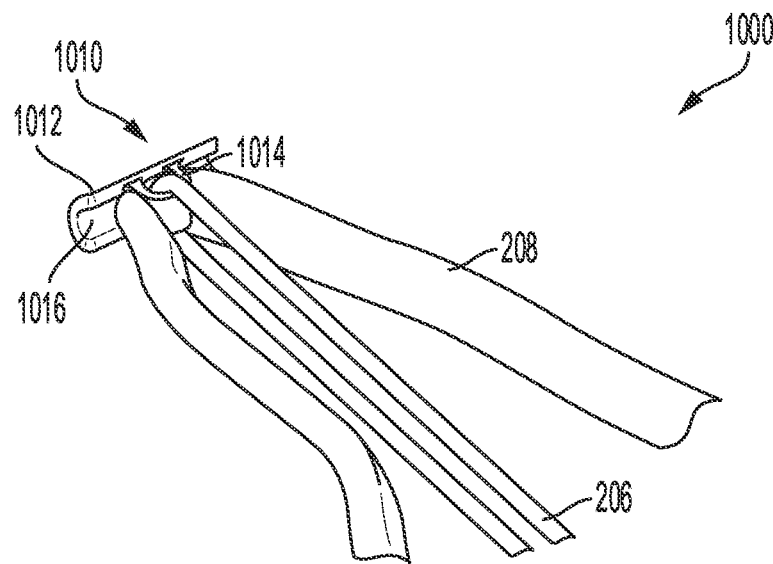

In some instances, the system 1000 may include a tendon graft 208. In one example of such instances, FIG. 10C illustrates the tendon graft 208 positioned through the opening 1018 along with the suture 206. In FIG. 10C, the tendon graft 208 and the suture 206 are shown away from the k-wire 204 for illustrative purposes and may be parallel to the k-wire 204 during insertion as described above (e.g., FIG. 10A). This parallel orientation enables the entire assembly of the flip button 1010, the tendon graft 208 and the suture 206 to fit within a drilled bone hole. In another example of the system 1000 including a tendon graft 208, FIG. 10D illustrates the tendon graft 208 positioned through the cannulation 1016. During insertion in this example, the tendon graft 208 is positioned through the cannulation 1016 along with the k-wire 204. FIG. 10D illustrates the system 1000 after the flip button 1010 is deployed from the k-wire 204 (e.g., similar to FIG. 10B).

The flip button 1010 may be constructed of any suitable medical-grade material for implants, such as titanium, a nickel-titanium alloy, stainless steel, or a polymeric composition including a polymer such as PEEK, PMMA, or ultra-high molecular weight polyetheylene. In aspects in which the flip button 1010 is constructed of a polymer, the cannulated anchor 100 may be manufactured by, for example, injection molding. In some instances, the material of the flip button 1010 may be selected based on a density of the bone for which it will be used. For example, titanium or stainless steel may be used for harder, denser bone, whereas a nickel-titanium alloy or a polymeric composition may be used for softer, less dense bone.

In some aspects of the present disclosure, the provided systems and cannulated anchors may include features for use in a tenodesis surgical procedure. In a tenodesis surgical procedure, a surgeon removes damaged tissue around an injured tendon (e.g., a biceps tendon) and detaches the tendon from its connection point in the body. For example, the surgeon may detach a biceps tendon from its connection with the labrum. The surgeon may remove any bone or cartilage fragments or bone spurs that may irritate the tendon, and then reattach the tendon using anchors and strong sutures to hold it in position. For example, the surgeon may reattach the biceps tendon to the humerus bone near the shoulder joint. The provided systems and cannulated anchors may be used, in some instances, to anchor a tendon to bone in a tenodesis surgical procedure. In at least some aspects, when used in a tenodesis surgical procedure, the provided systems and cannulated anchors may be used without a k-wire or other guidewire. Examples of the provided cannulated anchor adapted for a tenodesis surgical procedure are described in connection with FIG. 11A to 15B.

Figure 11B:
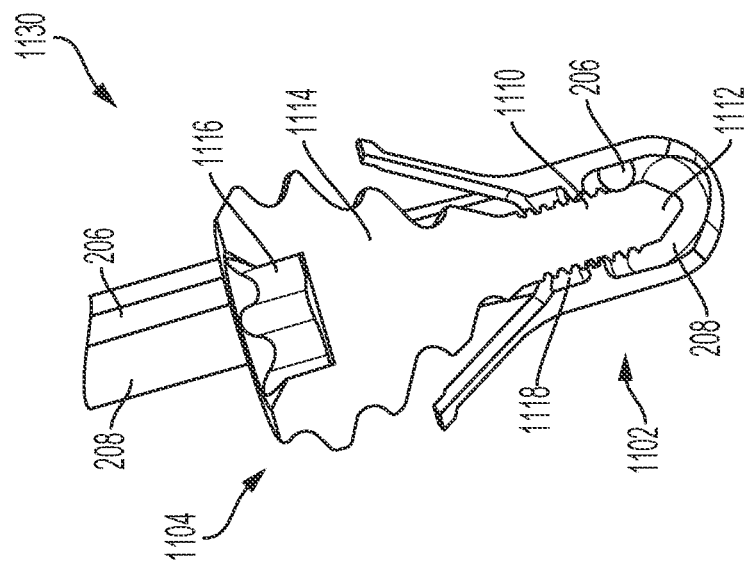
FIG. 11B illustrates a cross section of a system that includes suture and a tendon graft in addition to the cannulated anchor and tendon locking plug of FIG. 11A, according to an aspect of the present disclosure.
Figure 11A:
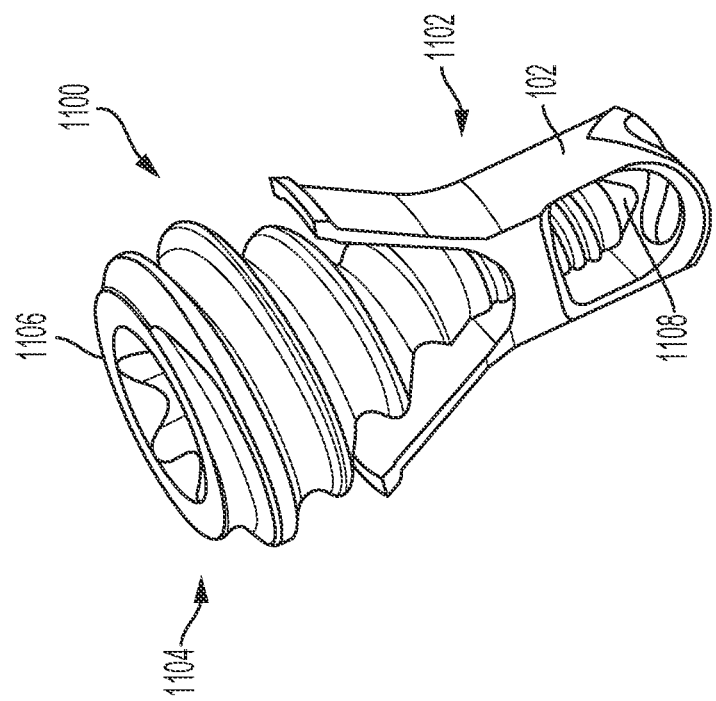
FIG. 11A illustrates a perspective view of a system including a cannulated anchor and a tendon locking plug, according to an aspect of the present disclosure.

Reference will first be made to both FIGS. 11A and 11B when describing the aspects in which the provided system and cannulated anchor include features for a tenodesis surgical procedure. FIG. 11A illustrates an example system 1100 including an example cannulated anchor 1102 and an example tendon locking plug 1104. In some examples, the system 1100 may include suture and/or a tendon graft. For instance, FIG. 11B illustrates a cross section of an example system 1130 that includes suture 206 and a tendon graft 208 along with the cannulated anchor 1102 and the tendon locking plug 1104. The cannulated anchor 1102, in various instances, may include any of the features described above in connection with the example cannulated anchors 100, 300A, 300B, 400, 530, 600, and 730. In some aspects, the cannulated anchor 1102 does not include an opening 112 or an elongated opening 114 in its body portion 102. For example, because the cannulated anchor 1102 may be used in a tenodesis surgical procedure that does not use a k-wire or other guidewire, the opening 112 or the elongated opening 114 are not needed in such applications. In at least some instances, a k-wire or other guidewire may create unneeded complexity in a tenodesis surgical procedure.

In at least some aspects, the cannulated anchor 1102 may include a portion that engages with the tendon locking plug 1104. In this example, the cannulated anchor 1102 includes an interior threaded portion 1118 that engages with threading on the tendon locking plug 1104. In various aspects, such as the one illustrated, the interior threaded portion 1118 may be on the portion of the body 102 of the cannulated anchor 1102 that forms the opening 110.

The tendon locking plug 1104 includes a body portion having a leading end 1108 and a trailing end 1106. In some instances, the trailing end 1106 includes a driver interface 1116 configured such that a surgeon or other user may position a driving instrument tip within the driver interface 1116 and advance the tendon locking plug 1104 into threading via the driving instrument. For example, the driver interface 1116 may be adapted for use with driving instruments having tips shaped as hexagon, hexalobe, square, Phillips, Pozidriv, Torx, Security T, etc. The leading end 1108 of the tendon locking plug 1104 includes a tip 1112. In some instances, the tip 1112 may be sharp. For instance, the tip 1112 may be suitably sharp to perforate a tendon graft 208.

The tendon locking plug 1104 may be constructed of any suitable biocompatible material. For example, stainless steel, a cobalt-chromium alloy, titanium, a titanium alloy, magnesium, or polyether ether ketone (PEEK) are suitable biocompatible materials.

In some aspects, the body portion of the tendon locking plug 1104 includes a distal threaded portion 1110 near the leading end 1108 and a proximal threaded portion 1114 near the trailing end 1106. In such aspects, the threading in the distal threaded portion 1110 includes an inner diameter that is smaller than an inner diameter of the threading in the proximal threaded portion 1114. In various instances, the inner diameter of the threading in the distal threaded portion 1110 may be constant. In various instances, such as the one illustrated, the inner diameter of the threading in the proximal threaded portion 1114 increases along the proximal threaded portion 1114 in the direction towards the trailing end 1106. The threading in the distal threaded portion 1110 of the tendon locking plug 1104 engages with the interior threaded portion 1118 of the cannulated anchor 1102. When the tendon locking plug 1104 and the tendon graft 208 are both installed in bone, the threading in the proximal threaded portion 1114 of the tendon locking plug 1104 applies pressure to, or wedges, a tendon graft 208 against a bone hole wall to help hold the tendon graft 208 in position. In some instances, a major diameter of at least some of the threading in the proximal threaded portion 1114 is greater than a width of the cannulated anchor 1102.

The leading end 1108 of the tendon locking plug 1104 may be advanced through the opening 110 of the cannulated anchor 1102 to couple the tendon locking plug 1104 to the cannulated anchor 1102. For instance, in this example, the tendon locking plug 1104 may be rotated via a driving instrument to engage the threading of the distal threaded portion 1110 with the interior threaded portion 1118 of the cannulated anchor 1102, which advances the leading end of the tendon locking plug 1104 through the opening 110. In various instances, the tendon locking plug 1104 is coupled to the cannulated anchor 1102 after a construct of the cannulated anchor 1102, the tendon graft 208, and the suture 206 are inserted into a bone hole. In such instances, as the leading end 1108 of the tendon locking plug 1104 is advanced through the opening 110, the tip 1112 may perforate the tendon graft 208 and advance into the tendon graft 208 (e.g., as illustrated in FIG. 11B). Perforating the tendon graft 208 may help hold the tendon graft 208 in position in some instances. As stated above, the proximal threaded portion 1114, in at least some instances, may wedge the tendon graft 208 against the bone hole wall, which also may help hold the tendon graft 208 in position.

Additionally, in at least some instances, the body portion 102 of the cannulated anchor 1102 does not include a protrusion (e.g., the protrusion 108) forming one or more grooves (e.g., the grooves 118A, 118B) when adapted for a tenodesis surgical procedure. During a tenodesis surgical procedure, a surgeon may slide the tendon graft 208 in order to achieve a desired tension in the tendon graft 208. Foregoing a protrusion in instances in which the provided cannulated anchor is adapted for a tenodesis surgical procedure may help improve the ease of sliding the tendon graft 208.

Figure 12:
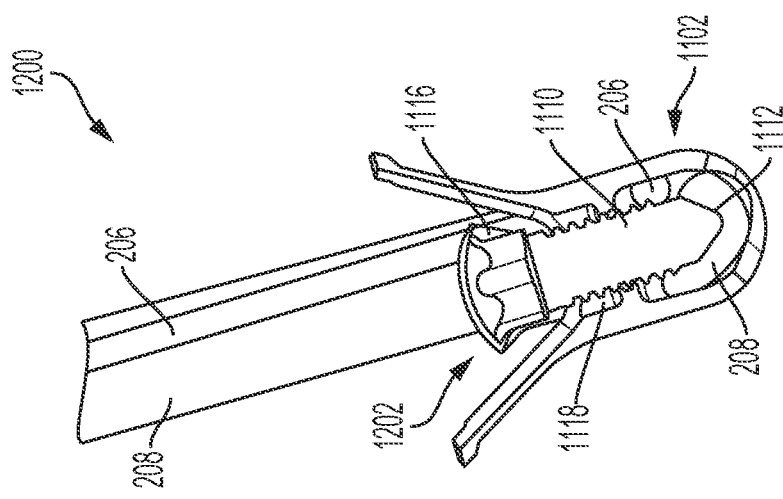
FIG. 12 illustrates a cross section of a system including a cannulated anchor and a tendon locking plug that includes only a distal threaded portion, according to an aspect of the present disclosure.

In some instances, wedging the tendon graft 208 against the bone wall may not be needed to maintain a position of the tendon graft 208. FIG. 12 illustrates an example system 1200 including the cannulated anchor 1102 and an example tendon locking plug 1202 that includes only a distal threaded portion 1110 (e.g., does not include a proximal threaded portion 1114). In such aspects, the tendon locking plug 1202 helps maintain a position of the tendon graft 208 only by puncturing the tendon graft 208 with the tip 1112. In some examples, the distal threaded portion 1110 of the cannulated anchor 1202 may have the same or similar length as the distal threaded portion 1110 of the cannulated anchor 1102. In other examples, the distal threaded portion 1110 of the cannulated anchor 1202 may be longer or shorter than the distal threaded portion 1110 of the cannulated anchor 1102.

Figure 13:
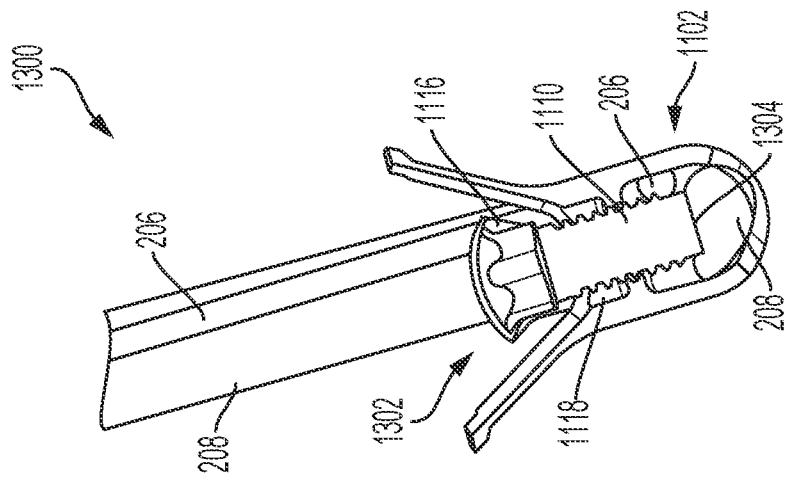
FIG. 13 illustrates a cross section of a system including a cannulated anchor and a tendon locking plug including a tip that is substantially flat, according to an aspect of the present disclosure.

In some instances, the provided cannulated anchor may help maintain a position of the tendon graft 208 without puncturing the tendon graft 208. FIG. 13 illustrates an example system 1300 including the cannulated anchor 1102 and an example tendon locking plug 1302 including a tip 1304 that is substantially flat or otherwise suitably dull such that it does not puncture or perforate the tendon graft 208. Rather than perforate the tendon graft 208, the tip 1304 wedges the tendon graft 208 against the cannulated anchor 1102 as the tendon locking plug 1302 is advanced through the opening 110 of the cannulated anchor 1102. The pressure on the tendon graft 208 between the tendon locking plug 1302 and the cannulated anchor 1102 may help maintain a position of the tendon graft 208. In the illustrated example, the tendon locking plug 1302 only includes a distal threaded portion 1110. In other examples, the tendon locking plug 1302 may include a proximal threaded portion 1114 (or the tendon locking plug 1102 may include a tip 1304 that is substantially flat).

Figure 14:
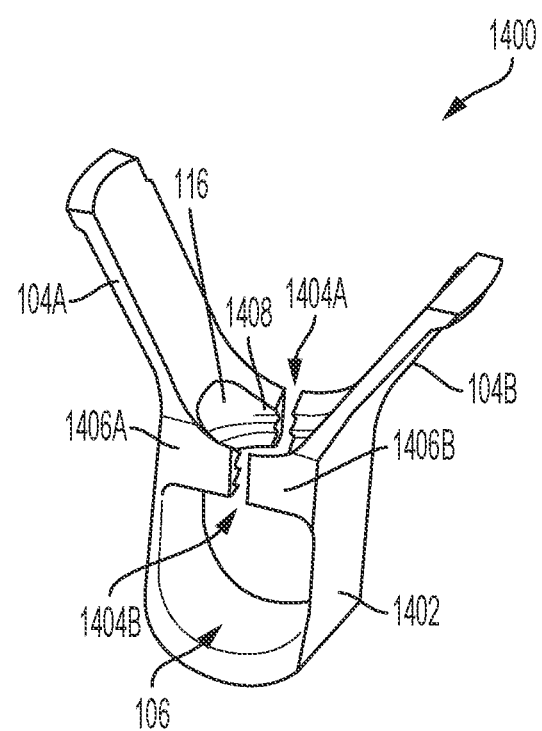
FIG. 14 illustrates a perspective view of a cannulated anchor having a split body portion, according to an aspect of the present disclosure.

In some aspects of the present disclosure, the tendon locking plugs 1102, 1202, or 1302 may be coupled to a cannulated anchor by suitable means other than rotating the tendon locking plug 1102, 1202, or 1302 to engage its threading with the interior threading 1118 of the cannulated anchor. For example, FIG. 14 illustrates an example cannulated anchor 1400 having a split body portion 1402. More specifically, the body portion 1402 of the cannulated anchor 1400 includes a gap 1404A and a gap 1404B such that the trailing end of the body portion 1402 is split into a first portion 1406A and a second portion 1406B. It should be appreciated that the first portion 1406A and second portion 1406B each extend from the gap 1404A and 1404B. In at least some instances, each of the first portion 1406A and the second portion 1406B include an interior coupling portion 1408, though this is only indicated on the first portion 1406A in FIG. 14 solely for the sake of clarity. The gaps 1404A and 1404B create spring-like behavior in the body portion 102 such that the first portion 1406A and the second portion 1406B can elastically expand and contract from one another. In at least some aspects, the elastic expansion and contraction of the first portion 1406A and the second portion 1406B enables a tendon locking plug 1104 to be coupled to the cannulated anchor 1400 without rotation of the tendon locking plug 1104. In some instances, rotating the tendon locking plug 1104 can cause undesired torque or friction to be applied to the bone, the tendon graft 208, the suture 106, etc., and thus the cannulated anchor 1400 can help eliminate such undesired torque or friction.

Figure 15B:
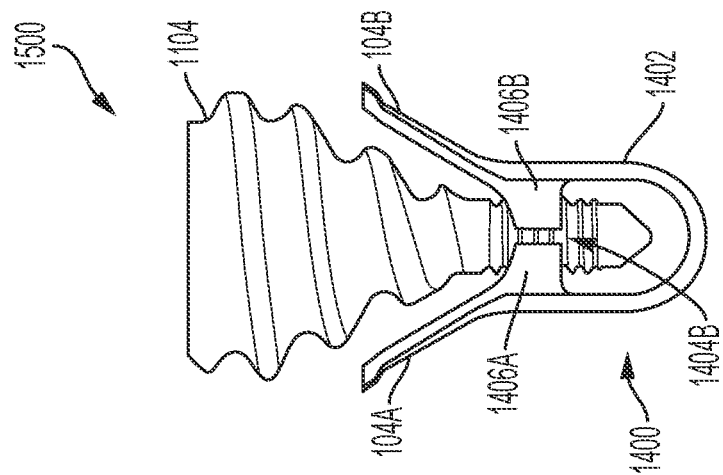
FIGS. 15A and 15B illustrate a cross sectional and front view, respectively, of a system including a cannulated anchor having a split body portion and a tendon locking plug.
Figure 15A:
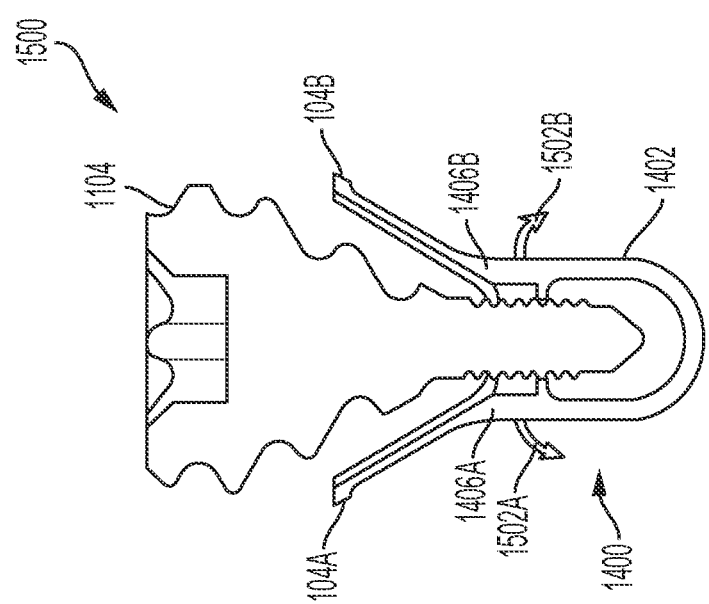

FIG. 15A illustrates an example system 1500 that includes the cannulated anchor 1400 and a tendon locking plug 1104. The arrows 1502A and 1502B indicate that the first and second portions 1406A and 1406B may be forced away from one another to allow the tendon locking plug 1104 to be inserted between the first and second portions 1406A and 1406B and into the cannulated anchor 1400. The elastic properties of the cannulated anchor 1400 bias the first and second portions 1406A and 1406B back towards one another, which applies force to the tendon locking plug 1104 to couple it to the cannulated anchor 1400. FIG. 15B illustrates the tendon locking plug 1104 coupled to the cannulated anchor 1400.

In some aspects, such as the one illustrated, the interior coupling portion 1408 of each of the first body portion 1406A and the second body portion 1406B is interior threading. In such aspects, the tendon locking plug 1104 includes exterior threading that may be positioned within the interior threading. As described above, the tendon locking plug 1104 does not have to be rotated to engage its exterior threading with the interior threading of the first and second body portions 1406A and 1406B. Rather, the first and second portions 1406A and 1406B may be forced away from one another to allow the exterior threading of the tendon locking plug 1104 to be positioned between the first and second portions 1406A and 1406B, and then the first and second portions 1406A and 1406B may be released so that their interior threading engages the exterior threading of the tendon locking plug 1104. In such aspects in which the interior coupling portion 1408 is threading, while the tendon locking plug 1104 can be inserted without rotation, the threading may help make removal of the tendon locking plug 1104 easier by rotating the tendon locking plug 1104 to disengage it from the cannulated anchor 1400 and the bone hole.

In some aspects, the interior coupling portion 1408 of each of the first body portion 1406A and the second body portion 1406B may be ratchets. In such aspects, the tendon locking plug 1104 may also include ratchets. For example, the interior coupling portion 1408 may include female ratchets and the tendon locking plug 1104 may include male ratchets. In at least some aspects, the male and female ratchets may be horizontal (e.g., perpendicular to a long axis of the cannulated anchor 1400) so that a position of the tendon locking plug 1104 remains coaxial with the cannulated anchor 1400 when the tendon locking plug 1104 is rotated relative to the cannulated anchor 1400.

Figure 16:
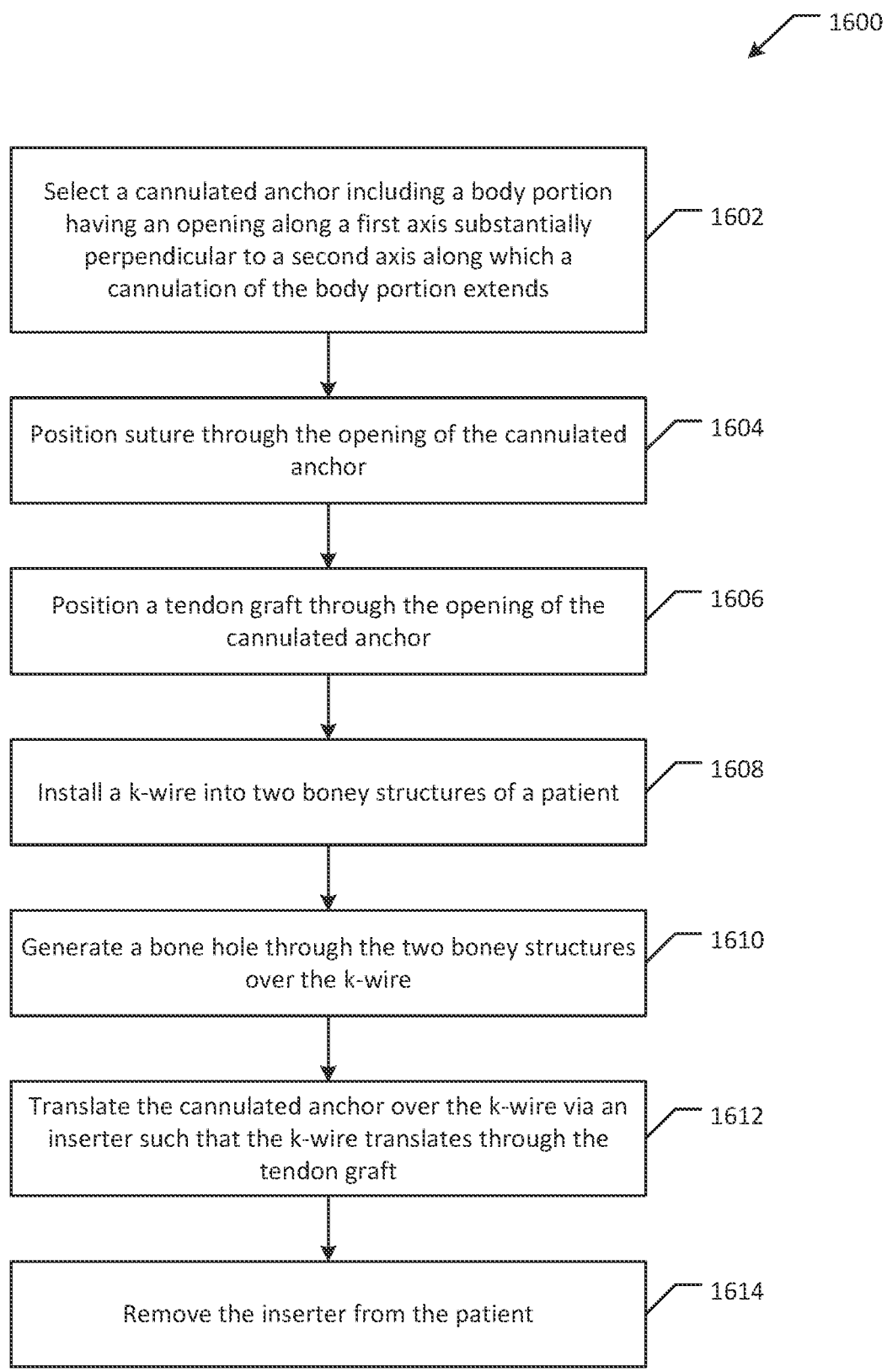
FIG. 16 illustrates a flow chart of an example method for treating instability in two boney structures, according to an aspect of the present disclosure.

FIG. 16 shows a flow chart of an example method 1600 for treating instability in two boney structures, according to an aspect of the present disclosure. Although the example method 1600 is described with reference to the flowchart illustrated in FIG. 16, it will be appreciated that many other methods of performing the acts associated with the method 1600 may be used. For example, the order of some of the blocks may be changed, certain blocks may be combined with other blocks, and some of the blocks described are optional.

A cannulated anchor may be selected including a body portion having an opening along a first axis substantially perpendicular to a second axis along which a cannulation of the body portion extends (block 1602). For example, the cannulated anchor 100 may be selected having a cannulation including the opening 110 and the opening 114. Suture (e.g., the suture 206) may be positioned through the opening (e.g., the opening 106) of the cannulated anchor 100 (block 1604). In various instances, a tendon graft (e.g., the tendon graft 208) may be positioned through the opening 106 of the cannulated anchor 100 (block 1606). In at least some examples, the tendon graft 208 may have a diameter between about two to three millimeters. A k-wire (e.g., the k-wire 204) is installed in two boney structures of a patient (block 1608). For instance, a surgeon may drill a k-wire into two boney structures of a patient at a desired location. In one example, the two boney structures may be a scaphoid bone and a lunate bone. In another example, the two boney structures may be a tibia bone and a fibula bone. In another example, the two boney structures may be a clavicle and a coracoid process. In various other instances, the two boney structures may be other suitable boney structures in a patient.

A bone hole is generated through the two boney structures over the k-wire 204 (block 1610). For example, a surgeon may generate the bone hole with a cannulated drill that is translated over the k-wire 204. The cannulated anchor 100 is then translated over the k-wire 204 via an inserter (e.g., the cannulated inserter 202) such that the k-wire 204 translates through the tendon graft 208, or stated differently, such that the tendon graft 208 translates over the k-wire 204 (block 1612). In some instances, the k-wire 204 may have a sharp trailing end such that the sharp end of the k-wire 204 pierces through the longitudinal fibers of the tendon graft 208. In other instances, a surgeon may split the longitudinal fibers in another suitable way to pass the tendon graft 208 over the k-wire 204. Passing the k-wire 204 through the tendon graft 208 allows the tendon graft 208 to take up more space within the opening 106 of the cannulated anchor 100 versus being biased to one side of the k-wire 204 during insertion. The k-wire 204 passes through the respective cannulations of the cannulated anchor 100 and the cannulated inserter 202 as the cannulated anchor 100 is translated over the k-wire 204. Translating the cannulated anchor 100 over the k-wire 204 guides the cannulated anchor 100 into the generated bone hole. In some instances, the assembly including the cannulated anchor 100, the tendon graft 208, and the suture 106 is tapped into place, such as with a mallet.

The cannulated inserter 202 may then be removed from the patient (block 1614). In some instances, removing the cannulated inserter 202 thereby sets the cannulated anchor 100 partially or fully into a desired position, as described above. In some instances, the k-wire 204 may be removed from the patient. In other instances, the k-wire 204 is left in place. The ends of the suture 106 may be pulled or tensioned to cause the cannulated anchor 100 to fully set if not already. For example, pulling or tensioning the suture 106 may cause the prongs 104A and 104B of the cannulated anchor 100 to bend away from one another. The suture 106 may be tied off once the cannulated anchor 100 is in a desired position.

In some aspects, the method 1600 may include installing an interference screw into one of the bones of the two boney structures. The interference screw may help maintain a desired position or level of compression of the two boney structures provided by the cannulated anchor 100 and suture 106, or by the cannulated anchor 100, suture 106, and tendon graft 208.

In some aspects, the method 1600 may include adjusting the tendon graft 208 to achieve a desired tension in the tendon graft 208. For example, adjusting the tendon graft 208 may be performed as part of a tenodesis surgical procedure. In at least some aspects, the tendon graft 208 may be adjusted after the cannulated anchor 100, tendon graft 208, and suture 106 are in a desired position, which may be before or after the suture 106 is tied off. In various aspects, the method 1600 may include installing a tendon locking plug (e.g., the tendon locking plug 1102). For example, the tendon locking plug 1102 may be installed in the cannulated anchor 100 after the tendon graft 208 is adjusted to a desired tension. A surgeon may install the tendon locking plug 1102 via a driving instrument. In some instances, the tendon locking plug 1102 may perforate the tendon graft 208 during installation. In such instances, the tendon locking plug 1102 may be advanced through the opening 110 of the cannulated anchor 100 until a desired perforation into the tendon graft 208 is achieved. In other instances, the tendon locking plug 1102 may compress (e.g., without perforating) the tendon graft 208 during installation. In such other instances, the tendon locking plug 1102 may be advanced through the opening 110 of the cannulated anchor 100 until a desired compression is achieved on the tendon graft 208 between the tendon locking plug 1102 and the cannulated anchor 100.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A system for treating instability of two boney structures, comprising:
   a cannulated anchor including a body portion having an opening along a first axis transverse to a second axis along which a cannulation of the body portion extends, wherein the cannulation extends along a full length of the cannulated anchor;
   a suture;
   a tendon graft, wherein both the suture and the tendon graft are positioned through the opening of the body portion;
   a cannulated inserter adapted to engage a trailing end of the body portion of the cannulated anchor, wherein the cannulated inserter comprises a cannulation along a full length of the cannulated inserter; and
   a k-wire positioned through the tendon graft positioned in the opening and through the cannulation of the cannulated anchor;
   wherein the suture is offset from the second axis and disposed between the k-wire and a periphery of the opening of the body portion.

2. The system of claim 1, wherein the body portion includes a protrusion extending into the opening thereby forming at least one groove, and wherein the suture is positioned within the at least one groove.

3. The system of claim 1, wherein the cannulated anchor includes at least one prong extending from the trailing end of the body portion.

4. The system of claim 1, wherein the cannulated anchor includes a set of angled lobes extending outward from the body portion.

5. The system of claim 1, wherein the cannulated anchor includes a plurality of ridges extending outward from the body portion.

6. The system of claim 1, wherein the cannulation of the cannulated anchor includes a first opening at the trailing end of the body portion and a second opening at a leading end of the body portion, wherein the first opening has a circular cross section, and wherein the second opening is elongated.

7. The system of claim 1, wherein an end of the suture is split such that the end includes a first end and a second end, wherein the first and second ends are positioned within respective first and second suture slots in the body portion of the cannulated anchor.

8. The system of claim 1, wherein the cannulated inserter includes a first lobe and a tip of the cannulated inserter includes a second lobe such that the first and second lobes are adapted to couple the cannulated anchor to the cannulated inserter during insertion of the cannulated anchor.

9. The system of claim 1, wherein the suture is positioned through the opening such that the suture is offset from a plane extending through the first and second axes.

10. The system of claim 1, further comprising a tendon locking plug.

11. The system of claim 10, wherein a portion of the cannulation of the body portion of the cannulated anchor includes interior threading, and wherein the tendon locking plug includes a distal threaded portion configured to interface with the interior threading to couple the tendon locking plug to the cannulated anchor.

12. The system of claim 11, wherein the tendon locking plug includes a proximal threaded portion opposite a distal threaded portion and a thread having a plurality of revolutions in the proximal and distal threaded portions, the thread having a greater inner diameter in the proximal threaded portion than the distal threaded portion.

13. The system of claim 10, wherein the tendon locking plug includes a distal tip configured to perforate the tendon graft.

14. The system of claim 1, wherein the two boney structures comprise a scaphoid bone and lunate bone.

15. A system for treating instability of two boney structures, comprising:
- a cannulated anchor including a body portion having an opening along a first axis transverse to a second axis along which a cannulation of the body portion extends, wherein the cannulation extends along a full length of the cannulated anchor, and wherein the cannulated anchor comprises at least one flexible prong configured to bend towards and away from the second axis;
- a suture;
- a tendon graft, wherein both the suture and the tendon graft are positioned through the opening of the body portion;
- a cannulated inserter adapted to engage a trailing end of the body portion of the cannulated anchor, wherein the cannulated inserter comprises a cannulation along a full length of the cannulated inserter; and
- a k-wire positioned through the tendon graft positioned in the opening and through the cannulation of the cannulated anchor;
- wherein the suture is offset from the second axis and disposed between the k-wire and a periphery of the opening of the body portion.

16. The system of claim 15, wherein the at least one flexible prong comprises two flexible prongs.

17. The system of claim 15, wherein the two boney structures comprise a scaphoid bone and lunate bone.

18. The system of claim 15, wherein the body portion includes a protrusion extending into the opening thereby forming at least one groove, and wherein the suture is positioned within the at least one groove.

* * * * *